United States Patent Office 3,249,498
Patented May 3, 1966

3,249,498
MERCURY CHLOROCYANURATE SALTS, PROCESSES FOR PREPARING SAME, AND COMPOSITIONS CONTAINING SAME
Edwin A. Matzner, St. Louis, Mo., assignor to Monsanto Company, St. Louis, Mo., a corporation of Delaware
No Drawing. Filed Mar. 15, 1965, Ser. No. 439,526
18 Claims. (Cl. 167—33)

The present application is a continuation-in-part of my co-pending U.S. applications Serial No. 252,309, filed January 18, 1963, and now abandoned, and Serial No. 256,145, filed February 4, 1963, and now abandoned. Serial No. 256,145 is a continuation-in-part of Serial No. 252,309.

The present invention relates to novel available halogen-containing compounds and to novel methods of preparing such compounds, and to novel compositions containing such compounds. The present invention further relates to a novel class of stable mercury-containing halocyanurate compounds which are useful and efficient as bleaching, oxidizing agents and are particularly efficient as sterilizing and antibacterial agents.

Chlorocyanurate compounds including trichlorocyanuric acid, dichlorocyanuric acid, and certain metal salts, such as the sodium and potassium salts of dichlorocyanuric acid are known and have been employed commercially in bleaching and laundering and dishwashing compositions. However, these known chlorocyanurates have certain disadvantages in that, when they are incorporated in such compositions and/or are dissolved in water, they tend to lose available chlorine. This loss almost always results in a diminution of the bleaching, oxidizing, sterilizing and disinfecting properties of such known compounds and compositions containing them either prior to or during their use. On the other hand, the mercury-containing halocyanurate compounds of the present invention are equally stable toward loss of available chlorine, but retain their sterilizing and disinfecting properties indefinitely under a wide range of commercial use conditions.

Compositions consisting essentially of trichlorocyanuric acid and alkaline alkali metal salts such as alkaline alkali metal phosphate and/or combinations of these with wetting agents and/or synthetic detergents such as, for example, sodium salts of alkylated benzene sulfonic acids are described in U.S. Patent No. 2,607,738, and Reissue Patent 24,414, issued to Edgar E. Hardy on August 9, 1952, and December 31, 1957, respectively. Dichlorocyanuric acid and processes for preparing this compound are described in U.S. Patent 2,964,525, issued to William L. Robinson on December 13, 1960. Certain metal salts of dichlorocyanuric acid and compositions containing dichlorocyanuric acid, sodium tripolyphosphate, and sodium sulfate are also described in U.S. Patent 2,913,460, issued to Arthur G. Brown et al. on November 17, 1959. Although certain compositions containing one of such acids or certain salts of dichlorocyanuric acid such as the sodium and potassium salts have been used for washing, bleaching, sterilizing, and disinfecting purposes, such as, for example, in laundering and dishwashing operations, such compositions possess certain disadvantages in that when they are dissolved in water they tend to lose substantial quantities of available chlorine. Thus the prior art compositions have, at best a limited and brief effectiveness as far as sterilizing and disinfecting properties are concerned. Also, although the surfaces of articles such as clothing, dishes, milk receptacles, food containers and the like, are usually rendered initially sterile after having been treated with the above-described prior art compositions (usually in the form of aqueous solutions thereof), such surfaces become immediately susceptible to contamination by micro-organisms such as bacteria, algae and fungi when exposed to air under the ordinary conditions of use of such articles.

The present invention provides, in part, novel mercury-containing halocyanurate compounds and novel stable compositions containing the aforementioned mercury-containing halocyanurate compounds which compositions are useful in bleaching, sanitizing, sterilizing and in disinfecting operations, and also provides compositions which have superior sterilizing and antimicrobial properties, compared with the prior art chlorocyanurate-containing compositions previously referred to herein. Compositions of the present invention are particularly useful in treating a wide variety of articles whose surfaces are susceptible to attack by micro-organisms, and rendering the articles resistant to such attack for prolonged periods of time (e.g. for from three months to more than one year), depending, primarily, on temperature and humidity conditions.

Accordingly, it is one object of the present invention to provide novel available halogen- and mercury-containing cyanurate compounds which are useful as bleaching, oxidizing, sterilizing and antibacterial agents.

It is another object of this invention to provide novel processes for producing such novel compounds.

It is another object of this invention to provide novel compositions or formulations containing the novel compounds.

Other objects and advantages of the present invention will become apparent from the following description and the appended claims.

COMPOUND DESCRIPTION

The present invention provides, in part, a class of novel compounds having the general formula:

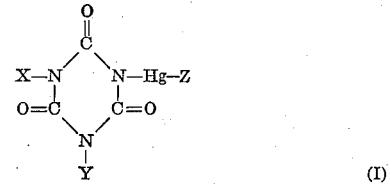

(I)

where X is a positive halogen atom such as bromine, chlorine, fluorine, and iodine, but is preferably bromine or chlorine, and more preferably is chlorine, Y is hydrogen or an alkali metal atom, and Z is a monovalent anion of a mineral acid or an organic acid and such ion is further characterized in being incapable of undergoing an oxidation-reduction reaction with the positive-halogen X.

Examples of monovalent anions of mineral acids which are characterized by Z in the above formula include, for example, chloride, bromide, iodide, nitrate, etc., anions. Monovalent anions of organic acids characterized by Z in the above general formula include, alkyl carboxylic, aryl carboxylic, alk-aryl carboxylic and aromatic heterocyclic carboxylic acids. Suitable anions of monovalent alkyl carboxylic acids generally have from one to about ten carbon atoms in the alkyl group and include, for example, formate, acetate, butyrate, propionate, etc., anions. Monovalent anions of aryl carboxylic acids include, for example, benzoate and naphthoate anions; alk-aryl carboxylic acid anions include, for example, phenylacetate, phenylbutyrate anions; aromatic heterocyclic carboxylic acid anions include, for example, picolinate and nicotinate anions.

The compounds of the present invention are usually white crystalline solids and, depending upon the particular compound, contain from about 5% to 28% available halogen. These compounds usually decompose without melting at temperatures in the range of from about 200° C. to 250° C. and may exist in hydrous or hydrated and anhydrous crystalline forms. When in the hydrated state under ambient temperature and humidity conditions, they usually readily lose their water of hydration and become anhydrous crystals. Generally, the halopositive bromo-, iodo- and fluoro-compounds tend to be less stable with respect to loss of available halogen than the corresponding chloro-compounds.

The compounds of this invention generally have a limited, but effective, solubility in water of from about 0.05% to about 0.5% by weight at 25° C. When crystallized from aqueous solutions at room temperature, e.g. 25° C., the compounds are usually obtained as anhydrous compounds. When crystallized at about 0° C. to about 5° C., many of the compounds may be obtained in the hydrate form from which they dehydrate and become anhydrous when exposed to atmospheric air (that is, air containing up to 75% relative humidity) at about 25° C. The compounds of this invention are significantly more effective as antibacterial agents than previously known available chlorine-containing cyanurate compounds.

Specific, useful compounds included in this invention and falling within the scope of the above general formula and having the hereinbefore described properties include:

N-monobromo, monohydrogen, isocyanuryl mercuric benzoate
N-monochloro, monohydrogen, isocyanuryl mercuric butyrate
N-monobromo, monopotassium, isocyanuryl mercuric chloride
N-monochloro, monosodium, isocyanuryl mercuric acetate
N-monochloro, monolithium, isocyanuryl mercuric chloride
N-monobromo, monohydrogen, isocyanuryl mercuric bromide
N-mono-iodo, monohydrogen, isocyanuryl mercuric bromide
N-mono-iodo, monohydrogen, isocyanuryl mercuric chloride
N-monobromo, monohydrogen, isocyanuryl mercuric chloride
N-mono-iodo, monohydrogen, isocyanuryl mercuric iodide Preferred compounds falling within the scope of the above general formula are compounds in which X is chlorine, Y is hydrogen or an alkali metal, and Z is chloride or acetate. Particularly preferred compounds of this invention falling within the scope of the above-described general formula and having the general properties hereinbefore described include:

N-monochloro, monohydrogen, isocyanuryl mercuric chloride
N-monochloro, monosodium, isocyanuryl mercuric chloride
N-monochloro, monopotassium, isocyanuryl mercuric chloride
N-monochloro, monohydrogen, isocyanuryl mercuric acetate N-monochloro, monohydrogen, isocyanuryl mercuric chloride is characterized in being soluble to the extent of about 0.07 gram per 100 ml. of water at 25° C. The pH of a saturated solution of this compound is about 3.9. The compound has a molecular weight of about 398.6 and has the following approximate elemental content:

| | Percent |
|---|---|
| Available chlorine | 17.8 |
| Total chlorine | 17.8 |
| Mercury | 50.4 |
| Carbon | 9.3 |
| Nitrogen | 10.5 |
| Oxygen | 12.0 |

N-monochloro, monosodium, isocyanuryl mercuric chloride is characterized in being soluble to the extent of about 0.18 gram per 100 ml. of water at 25° C. The pH of a saturated solution of this compound is about 6.0. The compound has a molecular weight of about 420.6 and has the following approximate elemental content:

| | Percent |
|---|---|
| Available chloride | 16.9 |
| Total chlorine | 16.9 |
| Mercury | 47.7 |
| Sodium | 5.5 |
| Carbon | 8.6 |
| Nitrogen | 10.0 |
| Oxygen | 11.4 |

N-monochloro, monopotassium, isocyanuryl mercuric chloride is characterized in being soluble to the extent of about 0.15 gram per 100 ml. of water at 25° C. The pH of a saturated solution of this compound is about 6.0. The compound has a molecular weight of about 436.7 and has the following approximate elemental content:

| | Percent |
|---|---|
| Available chlorine | 16.24 |
| Total chlorine | 16.24 |
| Mercury | 45.93 |
| Potassium | 8.95 |
| Carbon | 8.25 |
| Nitrogen | 9.62 |
| Oxygen | 11.00 |

N-monochloro, monohydrogen, isocyanuryl mercuric acetate is characterized in being soluble to an extent of about 0.12 gram per 100 ml. of water at 25° C. The pH of a saturated solution of this compound is about 5.6. The compound has a molecular weight of about 422.1 and has the following approximate elemental content:

| | Percent |
|---|---|
| Available chlorine | 16.80 |
| Total chlorine | 8.40 |
| Mercury | 47.53 |
| Carbon | 14.20 |
| Nitrogen | 9.95 |
| Oxygen | 19.00 |
| Hydrogen | .95 |

The preferred novel compounds of this invention are characterized in having excellent stability toward loss of available chlorine and in being highly effective bleaching, oxidizing and antibacterial agents.

PROCESS DESCRIPTION

The novel compounds of this invention falling within the above Formula I may be prepared, in general, by a process which comprises reacting a cyanurate, a halogen, with the proviso that when the cyanurate is a halocyanurate or a mixture of a halocyanurate and a cyanurate (other than another halocyanurate), no halogen is required and a mercuric salt of a monovalent anion selected from the group consisting of monovalent mineral and organic acid anions and characterized in being incapable of undergoing an oxidation-reduction reaction with positive halogen. The reaction is preferably carried out in an aqueous medium and until a compound, falling within the general formula hereinbefore described, is formed.

As will be hereinafter evident, the amount of reactants employed in the processes of this invention may vary widely. However, it has been found particularly advantageous to react a cyanurate and from about 0.9 to about 1.4 mols, per mol of said cyanurate, of a halogen with the proviso that when the cyanurate is a halocyanurate or a mixture of a halocyanurate and a cyanurate other than a halocyanurate no halogen is required, and from about 0.9 to about 3.0 mols, per mol of said cyanurate of a mercuric salt having a monovalent anion of a mineral acid or an organic acid as above-defined.

The temperature at which the above process is carried out may vary from between just above the freezing point to about or just below the boiling point of the aqueous medium, but is preferably in the range of from about 10° C. to about 75° C., more preferably in the range of from between about 20° C. and about 60° C. At temperatures below about 10° C., the time required for the completion of the reaction is often prolonged for a time which, in the commercial practice of this invention, would sometimes be unfeasible. At temperatures above about 75° C., there is the possibility of the decomposition of a portion of the triazine ring of the cyanurate, and the resultant formation of compounds such as $NCl_3$ which result in lower product yield and may also result in hazardous process conditions when the processes are practiced on a commercial scale.

The pH at which the reaction is carried out or, stated differently, the pH of the aqueous medium during the reaction may vary in the range of from about 2.9 to about 8.0 and generally depends on the particular compound which it is desired to prepare. Thus, for example, when it is desired to prepare compounds in which Y in the previously described general Formula I is hydrogen and X and Z are as described therein, the pH of the aqueous medium is usually in the range of from about 2.9 to about 4.0. On the other hand, when it is desired to prepare compounds in which Y is an alkali metal, such as, for example, sodium or potassium, the pH is usually in the range of from about 5.0 to about 8.0. When the pH of the aqueous medium is between about 4.0 and about 5.0, mixtures of compounds in which Y is hydrogen and Y is an alkali metal will usually be obtained.

If the pH of the aqueous medium falls or is permitted to fall below about 2.9, compounds such as dichlorocyanuric acid and trichlorocyanuric acid will often be formed. On the other hand, if the pH of the aqueous medium rises or is permitted to rise above about 8.0, metal salts of dichlorocyanuric acid may be formed and also some decomposition of the triazine ring may occur resulting in the formation of nitrogen trichloride. The desired pH of the aqueous medium may be attained in a variety of ways which will be evident hereinafter as the description proceeds.

When the process is carried out under the above conditions, the novel compounds of this invention usually form in and precipitate from the aqueous medium from which they can be separated by a variety of well-known methods, such as, for example, by filtration, centrifugation, decantation, and the like.

The cyanurate employed in the processes of this invention may be any of a wide variety of cyanurates or mixtures of these compounds. Thus, for example, cyanuric acid, metal salts of cyanuric acid including di- and tri-alkali metal cyanurates, alkaline earth metal cyanurates, and halocyanurates including dihalocyanuric acids and metal salts of dihalocyanuric acids, such as, for example, alkali metal and alkaline earth metal dihalocyanurates, may be employed. When metal cyanurates or metal halocyanurates are employed, alkali metal cyanurates and alkali metal halocyanurates have been found generally preferable for use in the processes of this invention. In some instances, it has been found advantageous to employ mixtures of cyanuric acid and one of the aforementioned metal cyanurates and/or metal dihalocyanurates. Generally speaking, the particular cyanurate or mixture of cyanurates employed will depend on a variety of factors, including the particular compound which is desired.

Although any halogen may be employed in the processes of this invention, chlorine and bromine result in more stable compounds and are preferred, and chlorine is particularly preferred. The halogen employed may be provided in a variety of forms, including the gaseous or liquid molecular forms (e.g., gaseous $Cl_2$ or liquid $Br_2$) or in the form of hypohalite or a halocyanurate, such as, for example, a metal hypohalite, a halocyanuric acid or a metal salt thereof.

The mercuric salt employed in the processes of this invention will depend on the particular compound which it is desired to prepare, but may be any mercuric salt of a monovalent mineral acid anion or a monovalent organic acid anion provided, however, that such anion is incapable of undergoing an oxidation-reduction reaction with the positive halogen designated as X in Formula I. Examples of such mercuric salts of monovalent mineral acid anions include mercuric chloride, bromide, iodide and nitrate, and the like. Examples of such mercuric salts of organic acid anions include mercuric formate, acetate, butyrate, propionate, benzoate, naphthoate, phenyl acetate, picolinate, and the like.

By way of example, it has presently been found possible to prepare a compound having the formula:

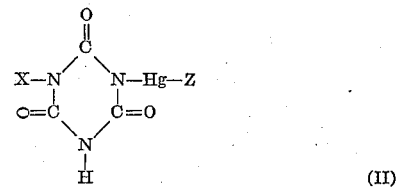

(II)

where X and Z have the same significance as in the previously described Formula I, by a process which comprises reacting, in an aqueous medium, cyanuric acid, from about 0.9 to about 1.4 mols, per mol of cyanuric acid of a halogen, preferably chlorine or bromine, and from about 0.9 to about 3.0 mols, per mol of cyanuric acid, of any of the previously described mercuric salts. The reaction in the above process is advantageously carried out at a temperature in the range of from about 10° C. to about 75° C., and at a pH in the range of from about 2.9 to about 4.0. Under the above conditions, the desired compound forms as a solid dispersed in the aqueous medium from which it may be separated as previously described herein.

In the above process, the halogen may be supplied to the aqueous medium either in the form of gaseous or liquid molecular elemental halogen, such as, for example, gaseous or liquid chlorine or liquid bromine or in the form of a metal hypohalite, such as an alkali metal or alkaline earth metal hypochlorite or hypobromite. When the halogen is reacted in other than elemental molecular form, that is, in the form of hypohalite, the amount of hypohalite will be determined by the amount of halogen in the hypohalite molecule. Thus, by way of example, only one-half the molar amount of alkaline earth metal hypohalite, compared with the amount of alkali metal hypohalite, is usually required. Generally speaking from about 0.9 to about 1.4 mols of halogen, per mol of cyanuric acid in the form of hypohalite halogen, is required.

When molecular halogen in gaseous or liquid form is employed in the above process, it has been found both desirable and advantageous to employ metal ions other than mercuric ions, for example, alkali or alkaline earth metal ions usually in the form of a water soluble hydroxide, in the aqueous medium to maintain the pH in the desired range. Although the reaction may be carried out with molecular elemental liquid or gaseous halogen and without metal ions under the conditions above-described, some difficulty may be encountered under these circumstances in preventing the pH of the aqueous medium from falling below about 2.0. Also, the reaction usually proceeds at a more optimum rate when metal ions are employed, since cyanuric acid tends to be relatively more soluble at a pH above 2.9, and the presence of metal ions usually insures a pH at or above about 2.9.

The amount of cyanuric acid employed in the aqueous medium may vary widely and may be in the form of a solution or slurry in such medium. However, it is preferred that the amount of cyanuric acid employed be such as to provide a solution of cyanurate ions in the aqueous medium.

The amount of mercuric salt employed in the above process is, as previously noted, dependent upon the amount of cyanurate employed. Such salt may vary widely within about 0.9 to 3 mols, per mol of cyanuric acid, and is preferably an excess of the molar quantity that is theoretically required. By way of example, from about 1.1 to about 2.0 mols of mercuric salt per mol of cyanuric acid is usually a preferred range of the quantity of mercuric salt employed.

The compounds of Formula II may also be advantageously prepared by a process which comprises reacting, in an aqueous medium, cyanuric acid and a metal salt, preferably a monovalent metal salt, of a dihalocyanuric acid in which the molecular proportions of cyanuric acid ions and dihalocyanuric acid ions are substantially equal and from about 0.9 to about 3.0 mols, per mol of total cyanurate, of any of the aforementioned mercuric salts, within the above described ranges of temperature and pH. By so proceeding, adequate quantities of halogen are provided to the aqueous medium to effect the reaction and insure maximum yields. Generally, when the metal salt of dihalocyanuric acid is the preferred monovalent salt, such as, for example, an alkali metal salt, the proportions of the dihalocyanurate to cyanuric acid are 1 mol of the dihalocyanurate per mol of cyanuric acid.

The compounds of Formula II may also be advantageously prepared by a process which comprises reacting, in an aqueous medium, cyanuric acid, up to about 1 mol, per mol of cyanuric acid, of an alkali metal dihalocyanurate, preferably an alkali metal dichlorocyanurate, and from about 0.9 to about 3.0 mols, preferably about 1.1 to about 2.0 mols, per mol of total cyanurate, of any of the previously described mercuric salts under the temperature and pH conditions hereinbefore described. The term "total cyanurate" as used herein is intended to refer to the total molar quantity of mixed cyanurates when mixed cyanurates are employed. Thus, in the above process, the total cyanurate refers to the molecular quantity of cyanuric acid plus the molecular quantity of the alkali metal dihalocyanurate. In this process, the compound forms in the aqueous medium as a solid, from which it may be readily recovered from the bulk of the aqueous phase of the medium.

The compounds of Formula II may also be prepared by a process which comprises reacting, in an aqueous medium, a di-alkali-metal cyanurate, from about 0.9 to about 3.0 mols, per mol of such cyanurate, of any of the hereinbefore described mercuric salts and a molecular proportion of elemental halogen, preferably a gaseous halogen, more preferably gaseous chlorine, within the temperature range hereinbefore described. In this process, the amount of halogen employed is an amount sufficient to provide a pH in the aqueous medium in the range of from about 2.9 to about 4.0. By so proceeding, an aqueous slurry comprising the compound dispersed as a solid in the aqueous phase of the slurry is formed.

In accordance with this invention, it is also possible to prepare a class of compounds having the general formula:

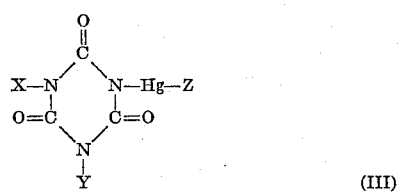

(III)

where X is a halogen, preferably chlorine, Y is an alkali metal, and Z has the significance hereinbefore described, by a process which comprises reacting, in an aqueous medium, a tri-alkali metal cyanurate, from about 0.9 to about 3.0 mols, per mol of said cyanurate of any of the herein described mercuric salts, and a halogen in molecular form, preferably a gaseous halogen, more preferably gaseous chlorine, in an amount sufficient to provide a pH in the range of from about 5.0 to about 8.0 and at a temperature in the range of from about 10° C. to about 75° C. In this process, the compound forms as a solid in the aqueous medium, from which it can be readily recovered as hereinbefore described.

The compounds of Formula III may also be prepared by a process which comprises adding a stoichiometric amount of an alkali metal hydroxide to an aqueous slurry of any of the compounds of Formula II. Generally speaking, however, better yields of the compounds of Formula III are obtained when such compounds are prepared by reacting tri-alkali metal cyanurate, halogen and the mercuric salt as above-described.

COMPOSITION DESCRIPTION

The present invention provides novel compositions comprising a mixture of (1) a positive halogen and mercury-containing compound having the general formula (as previously described) as follows:

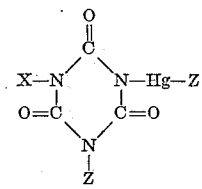

(I)

where X is a halogen atom, Y is selected from the group consisting of hydrogen and alkali metal atoms, and Z is a monovalent anion selected from the group consisting of mineral and organic acid anions which are characterized as being incapable of undergoing an oxidation-reduction reaction with X, and (2) an additional substance or material characterized in being compatible with and inert to the mercury-containing halocyanurate. Such compositions are useful, in bleaching and/or sterilizing operations and are also useful, for example, in the treatment of certain susceptible articles against attack by microorganisms.

The terms "additional substance" or "additional material," as used herein, are intended to mean and to include any synthetic, natural or processed substance or material which is compatible with and does not adversely affect the properties of the mercury-containing halocyanurate compounds, and preferably does not undergo an oxidation-reduction reaction with the mercury-containing halocyanurate.

The additional substance or material employed in the compositions of this invention as described above will depend in part on the intended end use of the compositions, that is, whether the compositions are to be used in treating articles which are susceptible to attack by micro-organisms to render such articles resistant to microbial or fungus attack, or whether the compositions are to be used, for example, in bleaching or sanitizing operations.

Thus, compositions which are intended for use in treating articles such as textiles, wood or plastic surfaces to render such articles resistant to attack by microorganisms, such as bacteria, algae and fungi, will often advantageously comprise a mixture of a mercury-containing halocyanurate compound and an inert diluent which is compatible with the mercury-containing halocyanurate. A wide variety of liquid, solid and semi-solid water-soluble and water-insoluble, inorganic and organic materials and mixtures thereof may be employed as inert diluents in the compositions of this invention.

Examples of solid, water-insoluble, inorganic materials which may be employed as inert diluents include substances such as talc, diatomaceous earth and kaolin, montmorillonite clays, such as bentonite, fuller's earth, and Attapulgus clay and water-insoluble inorganic oxides, such as silica, calcined magnesia, alumina, thoria, titania and the like, and water-insoluble alkaline earth metal salts, such as calcium phosphates, calcium sulfate, etc.; examples of solid water-insoluble organic materials include substances such as powdered cork, sawdust, walnut shells, powered water-insoluble synthetic resins and the like. Examples of solid, water-soluble, inorganic materials which may be suitably employed as inert diluents in the compositions of this invention include, for example, alkali metal salts, such as sodium and potassium nitrates, phosphates, carbonates, sulfates, silicates, borates and the like.

A variety of alkaline water-soluble alkali metal salts can be used as inert diluents and/or detergent builder salts in the compositions of this invention. As examples of such salts may be mentioned tri-alkali metal phosphate, trisodium hydrogen pyrophosphate, and tetrapotassium phosphate; dialkali metal hydrogen phosphates, such as disodium hydrogen phosphate and dipotassium hydrogen phosphate; the alkaline, water-soluble molecularly dehydrated alkali metal phosphate salts, such as the alkali metal pyrophosphates, for example, tetrasodium pyrophosphate, trisodium hydrogen pyrophosphate, and tetrapotassium pyrophosphate, also the alkali metal tripolyphosphates, such as sodium tripolyphosphate and potassium tripolyphosphate; alkaline, water-soluble alkali metal metaphosphates, such as sodium hexametaphosphate; the water-soluble alkali metal silicates, such as sodium silicates having a $Na_2O$ to $SiO_2$ mol ratio of 1.5:1 to 1:3.6, preferably 1:1 to 1:3.5, and the corresponding potassium silicates; water-soluble alkali metal borates, such as calcines sodium tetraborate or borax; and the water-soluble alkali metal carbonates or bi-carbonates, such as sodium and potassium carbonates. The above salts can be used alone or in various combinations with each other or with water-soluble neutral inert extenders which may also have some detergent building properties, for example, water-soluble, neutral, inert, inorganic alkali metal salt diluents, such as neutral alkali metal sulfates or chloride, for example sodium sulfate or sodium chloride.

Examples of solid water-soluble organic materials include hydrolyzed starch, carboxymethyl cellulose, non-ionic and cationic surfactants and anionic wetting agents or synthetic detergents such as those described in the abovementioned Hardy Patent 2,607,738 or Reissue Patent 24,412. Such agents or detergents include organic surface active sulfonates or sulfates having a hydrophobe and a hydrophile portion, the latter being a sulfate or a sulfonate group, for example, sodium salts of long-chain alkyl sulfates, sodium salts of alkyl benzene sulfonic acids, particularly those in which the alkyl group contains from 8 to 24, preferably 10 to 16, carbon atoms, sodium salts of sulfonated mineral oils and sodium salts of sulfosuccinic esters such as sodium dioctylsulfosuccinate.

Examples of semi-solid materials which may be suitably employed as inert diluents in the compositions of this invention include, for example, thixotropic, inorganic aqua-gels such as silica aqua-gels, alumina aqua-gels, and the like, and organic semi-solid materials, such as petroleum jelly and lanolin.

Examples of liquid, water-insoluble substances which may be used as inert diluents in the compositions of this invention include, for example, liquid petrolatum and aerosols, such as dichlorodifluoromethane and other fluorochloroalkanes which boil below room temperature at atmospheric pressure; examples of liquid water-soluble materials include water miscible organic liquids, such as alcohols, including methyl, ethyl, propyl, butyl, etc., alcohols, and glycerine and ketones.

From the foregoing, it is evident that the compositions comprising a mixture of a mercury-containing halocyanurate and the above-described inert diluents or mixtures thereof, may be dry or substantially dry solid particulate mixtures or powders which are suitable for application as solid particulates or powdered dusts or may be liquid or semisolid compositions suitable for application as sprays, or may be solids or liquids which can be further dispersed or diluted with additional liquid or solid inert diluents prior to use.

The concentration of mercury-containing halocyanurate compound in the compositions comprising mixtures of a mercury-containing cyanurate compound and an inert diluent may vary considerably, provided the required quantity of mercury-containing halocyanurate compound necessary to prevent microbial growth is deposited on and retained by the article to be treated or is present in the composition in an amount sufficient to effect bleaching, disinfecting, sterilizing and/or sanitizing when these properties are desired. Generally, the concentration of mercury-containing halocyanurate in the compositions or formulations will be in the range of from about 0.001% to about 95% by weight and will depend upon the intended end use of the composition, the balance consisting essentially of one or more of the additional substances hereinbefore described.

On the other hand, compositions which are concentrates, that is, compositions which are intended to be further diluted with water or a liquid or solid inert diluent prior to final use, will usually contain from about 0.5% to about 95% by weight of mercury-containing halocyanurate. Compositions or concentrates which are intended for use in rendering susceptible articles resistant to attack by micro-organisms will usually contain from about 0.001 to about 0.5% by weight of mercury-containing halocyanurate and compositions or concentrates which are intended for use with water in bleaching, sanitizing and washing operations will usually contain from about 1.0% to about 10% by weight of mercury-containing halocyanurate.

In one embodiment of this invention, a composition comprising from about 0.001% to about 0.5%, preferably from about 1% to 10% by weight of a mercury-containing halocyanurate, preferably a mercury-containing chlorocyanurate, more preferably N-monochloro-monohydrogen, isocyanuryl mercuric chloride or acetate and the balance of the composition consisting substantially of a water-insoluble, solid, inorganic, inert diluent such as powdered talc or bentonite or mixtures thereof, may be effectively used as a dust on the surface of painted or unpainted wood or ceramic tile or sheet plastic to prevent the growth of algae and/or mildew thereon.

In another embodiment of this invention, a composition comprising from about 0.001% to about 0.5%, preferably from about 1% to 10% by weight of a mercury-containing halocyanurate, preferably a mercury-containing chlorocyanurate, more preferably N-monochloro, monohydrogen isocyanuryl mercuric chloride or acetate and the balance of the composition consisting substantially of a water-insoluble, solid, inorganic, inert, diluent such as powdered talc or bentonite or mixtures thereof, may be effectively used as a dust on the surface of painted or unpainted wood or ceramic tile or sheet plastic to prevent the growth of algae and/or mildew thereon.

In another embodiment of this invention, a composition comprising from about 0.5% to 95%, preferably from about 1.0% to about 35% by weight of a mercury-containing halocyanurate, preferably a mercury-containing chlorocyanurate, more preferably N-monochloro, monohydrogen isocyanuryl mercuric chloride or acetate and the balance of the composition consisting substantially of sodium sulfate or a mixture of sodium sulfate and sodium silicate may be added to water or another suitable liquid and used as a bath in which textiles such as cotton and woolen materials may be immersed. Usually such liquid composition will consist of from about 0.5% to 15% by weight of solids. Textile materials so treated will be rendered impervious to mildew formation, under conditions in which mildew formation normally occurs, for a substantial period of time, e.g. for three months to more than one year, depending primarily on temperature and humidity conditions.

In another embodiment of this invention, a liquid composition comprising an organic liquid, inert diluent such as liquid dichlorodifluoromethane and from about 0.001% to about 0.5% by weight of a mercury-containing halocyanurate, preferably a mercury-containing chlorocyanurate, more preferably N-monochloro, monohydrogen isocyanuryl mercuric chloride, or acetate, dispersed in the liquid may be sprayed on the surfaces of plastic, wood or ceramic tile to prevent the growth of algae or the formation of mildew on such surfaces.

In still another embodiment of this invention, a composition comprising (1) from about 1.0% to about 10.0% by weight of a mercury-containing halocyanurate compound, preferably a mercury-containing chlorocyanurate, more preferably N-monochloro, monohydrogen isocyanuryl mercuric chloride, or acetate, and (2) an organic surface active agent, preferably an anionic surface active agent, more preferably sodium dodecyl benzene sulfonate, may be employed when dispersed in water or other suitable liquid as a liquid spray or as a bath for the treatment of wood, textiles and other articles to render the articles resistant to microbial or fungus attack.

Compositions of this invention which are especially useful in bleaching, sterilizing, sanitizing, laundering and dishwashing operations usually advantageously comprise a mercury-containing halocyanurate compound and a solid, water-soluble inorganic compound, preferably an inorganic detergent builder salt, such as those previously described herein, which is a water-soluble neutral to alkaline alkali metal salt.

A variety of neutral and alkaline water-soluble alkali metal salts can be used in such compositions. The proportions of such sats employed in the compositions of this invention can be varied considerably depending upon the end use of the composition, but is usually in excess of 40% and up to 96% by weight of dry solids content of the compositions. Of this, the alkaline alkali metal builder salts usually comprise about 10% to 95% by weight of total salts, and the inert diluent salt usually is used in amounts of about 90% to 5% by weight of total salts.

Although such compositions consist essentially of a mercury-containing chlorocyanurate compound and the alkaline salts or combinations thereof with the inert diluent salts hereinbefore referred to, the compositions can also contain relatively minor amounts usually less than 15% by weight on a solids bases, preferably about 1% to 10% by weight of anionic wetting agents or synthetic detergents such as those hereinbefore described.

The various ingredients suitable for inclusion in the bleaching and washing compositions of this invention can be used in such compositions in various proportions depending on whether the composition is to be used as a bleaching composition, dishwashing composition, or in a detergent composition, etc. However, in general, these compositions will contain, on a dry basis, from about 0.5% to about 10% by weight of anionic wetting agent when such wetting agent is used, and the remainder consisting substantially of alkaline alkali metal salts or combinations thereof, with the water-soluble inert diluent salts, hereinbefore described. In the case of aqueous compositions, the ingredients are normally present in the compositions in the same solids basis as given above, but the compositions may contain from 50% to 99% by weight of water.

In a preferred embodiment of the bleaching and washing compositions of this invention, such compositions comprise, on a solids basis, from about 3 to 15% by weight of a mercury-containing chlorocyanurate compound such as N-monochloro, monohydrogen isocyanuryl mercuric chloride or acetate from about 10 to 60% by weight of sodium tripolyphosphate or a mixture of such phosphate and sodium silicate and the remainder consisting substantially of sodium sulfate. Such compositions are useful as commercial laundry bleaches and dishwashing compositions. If desirable, these compositions may also contain from about 1% to about 5% by weight of trichlorocyanuric acid, dichlorocyanuric acid or metal salts thereof in addition to the above-mentioned components.

In another embodiment of the bleaching and/or washing compositions of this invention, the compositions comprise on a solids basis from about 3 to about 15% by weight of a mercury-containing chlorocyanurate compound as above-described from about 10 to 60% by weight of sodium tripolyphosphate and from about 0.1 to 5% by weight of anionic wetting agent, preferably sodium dodecylbenzene sulfonate, and the remainder consisting substantially of sodium sulfate. Such compositions are useful as household bleaches and sanitizing agents. When strong bleaching action is desired, a halocyanurate such as a dichlorocyanurate may be incorporated in addition to the mercury-containing halocyanurate in the bleaching compositions of this invention.

In still another preferred embodiment of the invention, the compositions comprise from about 3 to about 15% by weight of a mercury-containing chlorocyanurate such as N-monochloro, monohydrogen isocyanuryl mercuric chloride or acetate and the remainder consisting substantially of sodium carbonate or mixtures thereof with sodium tripolyphosphate. These compositions are useful as sanitizers and detergents, particularly in cleaning and sanitizing food processing equipment and containers. Food processing equipment and containers so treated will remain sterile even when subjected to contaminated atmospheric conditions for substantially longer periods of time than such equipment which has been treated with prior art chlorocyanurate compositions such as described in the aforementioned Hardy and Brown et al. patents. In most instances, the proportions and kind of ingredients in the formulations employed will depend on the purpose for which the formulation or composition is being used, that is, whether it is to be used for breaching, sanitizing, laundering, dishwashing, etc. Irrespective of the use involved, however, the compositions containing the mercury-containing halocyanurate compounds have a definitely greater tendency to render articles such as wood, paper, clothing, dishes and food processing equipment, etc., resistant to contamination by bacteria, algae, fungi, and other microorganisms when these compositions are employed in cleansing such articles.

A further understanding of the novel compounds and the novel processes of preparing the same, and the novel compositions of the present invention will be obtained from the following examples, which are intended to illustrate the invention, but not to limit the scope thereof, parts and percentages being by weight unless otherwise specified.

*Example I*

To 1.3 liters of water at room temperature (e.g., 30° C.) in a reaction vessel, there was added with agitation 129 grams of cyanuric acid. Thereafter, and while agitation was continued, 1.35 liters of an aqueous solution containing 75 grams of sodium hypochlorite were added to the reaction vessel. To the resultant solution was added, with agitation, 3.5 liters of a second aqueous solution at a temperature of 40° C. containing 298 grams of mercuric chloride, over a period of about five minutes. Upon addition of the last-mentioned solution, a white precipitate immediately formed and continued to form until all of the mercuric chloride solution had been added. The pH of the slurry was 3.9. The liquid was filtered and a white solid product was obtained. This solid was washed in cold (5° C.) water and dried in an oven at 90° C. Three hundred and sixty grams of a white anhydrous powder were obtained, corresponding to a yield of 90% of N-monochloro, monohydrogen, isocyanuryl mercuric chloride theoretically possible, based on the amount of cyanuric acid used.

Analysis of this product by standard analytical procedures showed it to have the following chemical content compared with the theoretical chemical content of N-monochloro, monohydrogen, isocyanuryl mercuric chloride:

|  | Found (percent) | Theoretical (percent) |
| --- | --- | --- |
| Mercury | 50.2 | 50.4 |
| Available chlorine | 17.5 | 17.8 |
| Total chlorine | 16.5 | 17.8 |
| Cyanuric acid | 32.0 | 32.3 |

X-ray diffraction analyses of the product were conducted using nickel filtered copper K alpha radiation at a wave length of 1.54050 angstroms. The X-ray diffraction pattern (with intensities of 5% and greater) was as follows:

| Interplanar spacing (d), angstroms | Relative intensity, percent |
| --- | --- |
| 3.931 | 100 |
| 5.273 | 96 |
| 2.540 | 93 |
| 4.643 | 90 |
| 3.005 | 75 |
| 3.424 | 70 |
| 3.312 | 70 |
| 2.428 | 63 |
| 2.513 | 59 |
| 2.102 | 55 |
| 6.021 | 51 |
| 4.207 | 30 |
| 8.499 | 14 |
| 2.635 | 12 |
| 1.963 | 10 |
| 3.864 | 9 |
| 3.798 | 8 |
| 3.559 | 5 |
| 5.121 | 5 |
| 1.816 | 5 |

*Example II*

The procedure of Example I was repeated, except that 3.5 liters of an aqueous solution containing 350 grams of mercuric acetate was used instead of the mercuric chloride solution employed in Example I.

A white anhydrous product was obtained, which upon analysis was found to have the following chemical content, which is compared with the theoretical content of N-monochloro, monohydrogen, isocyanuryl mercuric acetate.

|  | Found (percent) | Theoretical (percent) |
| --- | --- | --- |
| Mercury | 47.3 | 47.5 |
| Available chlorine | 16.9 | 16.8 |
| Total chlorine | 8.3 | 8.4 |
| Cyanuric acid | 30.3 | 30.6 |

*Example III*

One hundred eighteen grams of potassium dichlorocyanurate and 64.5 grams of cyanuric acid were dissolved in 2.1 liters of water at 30° C. in a reaction vessel. To the resultant solution, which had a pH of 3.8, there was added with agitation an aqueous solution containing 298 grams of mercuric chloride dissolved in 3.5 liters of warm water. During the addition of the last mentioned solution, a white precipitate progressively formed. During the addition, the pH of the medium was maintained at 3.5 by slow addition of an aqueous 45% KOH solution, 60 g. of the solution being required. The precipitate was filtered and washed and dried using the procedure described in Example I. Three hundred sixty-seven grams of a white, powdered material was obtained. Chemical and X-ray diffraction analysis of this material showed it to be N-monochloro, monohydrogen, isocyanuryl mercuric chloride, that is the product obtained by the process described in Example I.

*Example IV*

The process of Example III was repeated, except that 2.1 liters of a slurry containing 162.4 grams of potassium dibromocyanurate and 64.5 grams of cyanuric acid were substituted for the first-mentioned solution of that example, and that the slurry was stirred for 5 hours at room temperature prior to filtration. The white, powdered product obtained by this process was found to be N-monobromo, monohydrogen, isocyanuryl mercuric chloride.

*Example V*

To 2.1 liters of a slurry containing 162.4 grams of potassium dibromocyanurate and 64.5 grams of cyanuric acid there was added with agitation 9.0 liters of a solution containing 370 grams of mercuric bromide, which was at a temperature of 60° C. The resulting slurry was stirred at room temperature for 5 hours, and the pH maintained at 3-4 by addition of potassium hydroxide as in Example III. The white precipitate was recovered by filtration, washed and dried in accordance with the procedure described in Example I. The white powder obtained by this process was found to be N-monobromo, monohydrogen, isocyanuryl mercuric bromide.

*Example VI*

Three hundred eighty-eight grams of cyanuric acid and 240 grams of sodium hydroxide were dissolved in sufficient water to form 5.0 liters of an aqueous solution of disodium cyanurate. The resulting solution was then cooled to 10° C. and introduced into a chlorination vessel comprised of a jacketed cylindrical glass container having an internal diameter of 5 inches and an internal height of 13 inches. The container was supplied with 3 equidistantly spaced vertical baffles of one inch width spaced vertically inward one inch from the inside wall of the container. The total capacity of the container was about 3.5 liters of solution. Agitation was provided by a shaft mounted incident with the vertical axis of the container and provided with a six-bladed turbine propeller of 2-inch diameter spaced 2 inches above the inside of the bottom of the container and a second six-bladed turbine propeller of 2-inch diameter spaced 5 inches above the first-mentioned propeller. The shaft and propellers were rotated at 2,300 r.p.m. or a propeller top speed of 1,200 feet per minute.

The container was also provided with an outlet tube extending vertically downward into the container, a distance of 10 inches from the bottom of the container for the removal of the reaction products. At such distance, the outlet tube enabled the maintenance of a constant volume of about 900 ml.

Concurrent, with the introduction of the solution into the vessel and under continuous agitation, gaseous chlorine was introduced into the liquid in an amount and at a rate sufficient to maintain the pH at about 3.5.

Simultaneously with the addition of chlorine, there was pumped into the vessel an aqueous solution of 900 grams of mercuric chloride in sufficient water to make 10.0 liters of solution. The volumetric addition rate was exactly twice that of the disodium cyanurate solution, so that both solutions would be exhausted simultaneously. The volume of the liquid in the container was maintained at 900 ml. by continually pumping a portion of the liquid, which was then in the form of an aqueous slurry and which contained a white solid dispersed in the liquid phase of the slurry, from the vessel through the removal tube. The rate of pumping was sufficient to permit the chlorination of about 40 ml. of slurry per minute while the volume was maintained constant at 900 ml. The resulting chlorinated slurry was collected in a glass carboy. The reaction was continued for about 380 minutes until all of the two liquid solutions had been transformed into a chlorinated slurry. The chlorinated slurry was then filtered through filter paper in a Buchner funnel, the resulting filter cake washed three times with 200 ml. increments of cold (5° C.) distilled water and dried to constant weight in an oven maintained at 90° C. The product, which consisted of 1,145 grams of a white powdered material was identified using standard analytical and X-ray diffraction procedures as N-monochloro, monohydrogen, isocyanuryl mercuric chloride. The product yield was 96 of the yield theoretically possible based on the cyanurate used.

*Example VII*

To the chlorination vessel of Example VI there was introduced 5.0 liters of a cold solution (10° C.) containing 730 grams of tripotassium cyanurate. Simultaneously with the introduction of the above solution there was added gaseous chlorine in an amount and at a rate sufficient to maintain the pH at about 6.5, and a solution of 920 grams of mercuric chloride, in sufficient water to make 10 liters of solution, at a volumetric rate exactly twice that of the tripotassium cyanurate solution, so that both solutions would be exhausted simultaneously. The volume of the liquid in the container was maintained constant at 900 ml. by continually pumping a portion of the liquid which had been transformed into an aqueous slurry through the removal tube of the chlorination vessel. The rate of pumping was sufficient to permit the chlorination of 40 ml. of slurry per minute while maintaining the volume constant at 900 ml. The resulting chlorinated slurry was collected in a glass carboy. The chlorination reaction was continued for about 380 minutes until all of the liquid had been converted to chlorinated slurry. The collected chlorinated slurry was then filtered, washed and dried in accordance with the procedure of Example VI. The recovered white powder weighed 1,110 grams, representing a yield of about 85% of N-monochloro, monopotassium isocyanuryl mercuric chloride theoretically possible based on the tripotassium cyanurate charged. The powdered material was identified using standard analytical and X-ray diffraction procedures as N-monochloro, monopotassium isocyanuryl mercuric chloride.

*Example VIII*

The procedure of Example VII was repeated, except that trisodium cyanurate was used on the same molar basis instead of the tripotassium cyanurate of that example. The white powdered product obtained was found to be N-monochloro, monosodium, isocyanuryl mercuric chloride.

*Example IX*

To illustrate the stability and utility of some of the preferred compounds of this invention, dry mixed compositions containing the following ingredients in the percentages given in Table I were prepared:

Portions of the above compositions were stored at 50° C. at a relative humidity of 50% for 7 days. Available chlorine analyses of these compositions showed that the available chlorine content of these compounds after storage was substantially the same as the initial available chlorine content of the compositions.

One percent aqueous solutions of the above compounds were prepared and separate two-inch square swatches of grass stained muslin fabric were immersed in 50 ml. aliquots of the solutions. The solutions containing the muslin swatches were then heated to 50° C. for five minutes. In all instances, the grass stain was removed from the muslin. Control solutions containing distilled water only did not remove grass stains from muslin fabric when treated in an identical manner.

Glass beakers which were rinsed in .5% solutions of the above compositions 1 through 8 remained sterile for more than seven days when exposed to ambient conditions on a laboratory shelf. On the other hand, beakers which had been rinsed in distilled water and placed along side the treated beakers showed significant bacterial and mold contamination within this time period as determined by standard microbiological procedures.

*Example X*

The following experiments illustrate the bacteriostatic and fungistatic activity of the four particularly preferred compounds of this invention, when compared with potassium dichlorocyanurate.

The compounds N-monochloro, monohydrogen, isocyanuryl mercuric chloride, N-monochloro, monohydrogen, isocyanuryl mercuric acetate; N-monochloro, monosodium, isocyanuryl mercuric chloride; N-monochloro, monopotassium, isocyanuryl mercuric chloride and potassium dichlorocyanurate designated I, II, III, IV and V, respectively, were submitted as unknowns for testing for bacteriostatic properties against the bacteria *Staphylococcus aureus* and *Salmonella typhosa* and for fungistatic properties against *Aspergillus niger*. Standard screening procedures in which serial dilutions of the compounds were incorporated in nutrient agar which was then inoculated with the above-mentioned organisms were employed. The lowest concentrations of the compounds which inhibited the growth of these organisms were thus readily determined and are given in the following table.

TABLE I

| Ingredient | Composition number | | | | | | | |
|---|---|---|---|---|---|---|---|---|
| | 1 | 2 | 3 | 4 | 5 | 6 | 7 | 8 |
| N-monochloro, monohydrogen, isocyanuryl mercuric chloride | 5 | 0 | 0 | 0 | 3 | 0 | 0 | 0 |
| N-monochloro, monosodium isocyanuryl mercuric chloride | 0 | 4 | 0 | 0 | 0 | 3 | 0 | 0 |
| N-monochloro, monopotassium isocyanuryl mercuric chloride | 0 | 0 | 3 | 0 | 0 | 0 | 5 | 0 |
| N-monochloro, monohydrogen, isocyanuryl mercuric acetate | 0 | 0 | 0 | 5 | 0 | 0 | 0 | 4 |
| Sodium tripolyphosphate | 40 | 30 | 40 | 30 | 40 | 30 | 40 | 30 |
| Sodium sulfate | 25 | 30 | 25 | 30 | 20 | 25 | 25 | 20 |
| Sodium carbonate | 25 | 30 | 25 | 0 | 20 | 25 | 25 | 20 |
| Sodium silicate | 5 | 0 | 7 | 30 | 10 | 17 | 5 | 20 |
| Sodium dodecylbenzene sulfonate | 0 | 6 | 0 | 0 | 7 | 0 | 0 | 6 |

TABLE II

| Compound | Lowest concentration inhibiting parts per million | | |
|---|---|---|---|
| | S. aureus | S. typhosa | A. niger |
| I | 13 | 13 | 13 |
| II | 15 | 15 | 15 |
| III | 20 | 20 | 20 |
| IV | 17 | 17 | 17 |
| V | 724 | 724 | 724 |

Example XI

Dry mixed powdered compositions containing the following ingredients in the percentages given were prepared:

Compositions 18 through 22 which consisted of dispersions of mercury-containing chlorocyanurates in dichlorodifluoromethane were placed in separate weighed

TABLE III

| Ingredient | Composition No. | | | | | | | | |
|---|---|---|---|---|---|---|---|---|---|
| | 9 | 10 | 11 | 12 | 13 | 14 | 15 | 16 | 17 |
| N-monochloro, monohydroxy isocyanuryl mercuric chloride | 0.10 | | | | | 0.20 | 0.10 | 0.15 | 0.15 |
| N-monochloro, monosodium isocyanuryl mercuric chloride | | 0.10 | | | | | | | |
| N-monochloro, monopotassium isocyanuryl mercuric chloride | | | 0.10 | | | | | | |
| N-monochloro, monohydrogen isocyanuryl mercuric acetate | | | | 0.10 | | | | | |
| Potassium dichlorocyanurate | | | | | 1.0 | | | | |
| Powdered talc (No. 325 mesh) | 99.90 | | | 99.90 | 99.0 | | | 50.00 | 49.85 |
| Powdered bentonite | | 99.90 | | | | | 50.00 | | 25.00 |
| Fuller's earth | | | 99.90 | | | | | 49.85 | 25.00 |
| Wood flour | | | | | | 99.80 | 49.90 | | |

All of the above-powdered compositions had a particle size such that substantially 100% of each composition passed through a No. 325 mesh U.S. standard screen.

One hundred milligrams of the above compositions were uniformly dusted on one surface of separate, kiln dried 0.5 cm. thick maple wood strips (tongue depressors). The dusted surface in each instance was 10 cm. x 1.5 cm. The dusted surfaces were rinsed with 20 ml. distilled water and each strip was immersed in separate suspensions of mixed spores of the fungi *Chaetomium globosum*, *Metarrhizium* sp. and *Aspergillus niger*. The inoculated strips were then incubated at 30° C. in an atmosphere of 90% relative humidity for one week. At this time growth or lack of growth of as indicated by darkening (such as in mildew formation) of the wood was observed on the treated and untreated side of each wooden strip.

In all instances the untreated side of each strip had darkened and exhibited mildew formation. However, in the case of the treated sides of the strips only the strip which had been dusted with composition No. 13 containing 1% by weight potassium dichlorocyanurate exhibited the same darkening as the untreated sides of the wooden strips. In all other instances, the treated sides of the wooden strips exhibited no darkening and appeared substantially as they were at the beginning of the experiment.

Example XII

Liquid compositions containing the following ingredients in the percentages given as shown in Table IV were prepared:

pressure resistant container dispensers equipped with a spraying nozzle. One side of 5 separate wooden strips similar to those described in Example XI were sprayed respectively with 100 milligrams of one of the five compositions. The wooden strips were permitted to dry, rinsed with 20 ml. of distilled water and immersed in spore suspensions similar to and having the same spores as the suspensions described in Example XI. The inoculated strips were incubated and evaluated as described in Example XI.

In all instances the untreated sides of the wooden strips showed the presence of mildew formation. The strips which had been treated on one side with compositions 18 through 21 exhibited no mildew formation on the treated side. However, the strip which had been treated with composition No. 22 containing potassium dichlorocyanurate exhibited significant mildew formation, although of slightly less intensity than the mildew formation which occurred on the untreated sides of the wooden strips.

Compositions 23 through 27 consisted of solutions of varying concentrations of N-monochloro, monohydrogen isocyanuryl mercuric chloride, polyvinyl alcohol and water. The surface sides of five previously unused separate wooden strips similar to those previously used were "painted" with 100 milligrams of compositions 23 through 27. The strips were dried, rinsed, inoculated, and incubated as described in Example XI. In every instance mildew formation was prevented on the treated side of the wooden strips although appreciable mildew formation was observed on the untreated side of the strips.

TABLE IV

| Ingredient | Composition No. | | | | | | | | | |
|---|---|---|---|---|---|---|---|---|---|---|
| | 18 | 19 | 20 | 21 | 22 | 23 | 24 | 25 | 26 | 27 |
| N-monochloro, monohydrogen isocyanuryl mercuric chloride | 0.2 | | | | | 0.01 | 0.02 | 0.05 | 0.07 | 0.01 |
| N-monochloro, monosodium isocyanuryl mercuric chloride | | 0.2 | | | | | | | | |
| N-monochloro, monopotassium isocyanuryl mercuric chloride | | | 0.2 | | | | | | | |
| N-monochloro, monohydrogen isocyanuryl mercuric acetate | | | | 0.2 | | | | | | |
| Potassium dichlorocyanurate | | | | | 2.0 | | | | | |
| Dichloro-difluoromethane | 99.8 | 99.8 | 99.8 | 98.0 | 98.0 | | | | | |
| Polyvinyl alcohol | | | | | | 1.00 | 2.00 | 1.00 | 2.00 | 2.00 |
| Water | | | | | | 98.99 | 97.98 | 98.95 | 97.93 | 97.99 |

Example XIII

Dry mixed compositions containing the following ingredients in the percentages given as shown in Table V were prepared:

TABLE V

| Ingredient | Composition No. | | | | | | | | | |
|---|---|---|---|---|---|---|---|---|---|---|
| | 28 | 29 | 30 | 31 | 32 | 33 | 34 | 35 | 36 | 37 |
| N-monochloro, monohydrogen, isocyanuryl mercuric chloride | 4.0 | | | | | 10.0 | 5.0 | 5.0 | 5.0 | 5.0 |
| N-monochloro, monosodium, isocyanuryl mercuric chloride | | 4.0 | | | | | | | | |
| N-monochloro, monopotassium, isocyanuryl mercuric chloride | | | 4.0 | | | | | | | |
| N-monochloro, monohydrogen isocyanuryl mercuric acetate | | | | 4.0 | | | | | | |
| Potassium dichlorocyanurate | | | | | 4.0 | | 5.0 | | | |
| Sodium tripolyphosphate | 30.0 | 20.0 | | 35.0 | 30.0 | | | 30.0 | 25.0 | 30.0 |
| Tetrasodium pyrophosphate | | | 30.0 | | | | | 30.0 | 25.0 | 20.0 |
| Sodium sulfate | 66.0 | 76.0 | 66.0 | 56.0 | | | | | 25.0 | 20.0 |
| Sodium carbonate | | | | | 66 | 90.0 | 90.0 | 30.0 | 10.0 | 10.0 |
| Sodium metasilicate | | | | 5.0 | | | | | 5.0 | 9.0 |
| Sodium dodecylbenzene sulfonate | | | | | | | | 5.0 | 5.0 | 6.0 |

Portions of the above compositions were stored at 50° C. at a relative humidity of 50% for 7 days. Available chlorine analyses of these compositions conducted prior to and after storage showed that the available chlorine contents were substantially the same, indicating that these compositions were substantially stable toward loss of available chlorine.

Five-tenths of one percent aqueous solutions of the above compositions were prepared and separate two-inch square swatches of grass stained muslin fabric were immersed in 50 ml. aliquots of the solutions. The solutions containing the muslin swatches were then heated for five minutes. In all instances the grass stain was bleached from the muslin. Control solutions containing comparable amounts of sodium tripolyphosphate, sodium sulfate and sodium dodecyl benzene sulfonate in distilled water did not remove grass stains from the muslin fabric when such stained fabric was treated as above described.

The concentration of mercury-containing chlorocyanurate compound in solution varied in the range of from 0.02 to 0.05% by weight in the above experiment and show the pronounced bleaching activity of the compositions of this invention.

Example XIV

One percent aqueous solutions of compositions 28 through 37 were prepared and one each of ten separate 6" x 8" test strips of osnaburg fabric were immersed in one of the solutions. The solutions containing the strips were heated and maintained at 50° C. with occasional agitation. The test strips were then rinsed in two respective separate 400 ml. aliquots of distilled water at a temperature of 50° C. and air dried.

The test strip fabric was then exposed to the textile rotting organism, *Chaetomium globosum*, for 14 days by the method given in the U.S. Army Corps of Engineers Specification T-1452-A, entitled "Processing Fabrics, Cordage and Threads for Mildew Proofing," paragraphs F–3–a (3) to 3–a (8), inclusive. Two untreated strips of cloth were also exposed to this test. At the end of the test period, there was no evidence of fungus growth on the cloth strips treated with compositions 29, 30, 31, 33, 34, 35, 36 and 37. The cloth strip treated with composition 32 exhibited substantial attack by fungus, and the untreated (control) fabrics were heavily attacked by the fungus. The concentration of the mercury-containing halocyanurate compounds of the above solutions of the compositions varied in the range of from 0.04 to 0.1% by weight and are indicative of the substantial antifungal activity of the concentrations of this invention.

From the foregoing data it will be apparent that the compounds of this invention may be used in a wide variety of circumstances when it is desired to prevent the growth of bacteria and fungi. Examples of such uses are wood preservation, disinfection, the inhibition of bacterial and fungus growth in recirculating water systems, the impregnation of packaging materials to provide an inhibiting barrier against the invasion of the micro-organisms and contamination of the packaged material.

It will be apparent that quite different effects can be obtained by variously modifying the formulations containing the compounds of this invention to accommodate them to a particular method of application or use of bacteriostatic and fungistatic formulations. Water-soluble formulations such as those described in Example IX may be suitable. On the other hand, compounds of this invention may be dispersed in an inert extender or carrier agent which may be water soluble or water insoluble. In the instant specification, it is to be understood that the term "dispersed" is used in its widest possible sense. That is, to mean the particles of the compounds may be molecular and held in true solution during or immediately prior to use. It further means that the particles may be colloidal in size and may be distributed in liquid phase in the form of suspensions or emulsions or in the form of particles held in suspension by wetting agents. The term "dispersed" also means that the particles may be mixed with and distributed throughout a solid carrier providing a mixture in particulate form, e.g. pellets, granules, powders or dusts.

The compounds of this invention can be dispersed by suitable methods, such as tumbling or grinding, and the solid extending or carrier agents may be either organic or inorganic nature as previously described. Such solid materials include, for example, tricalcium phosphate, calcium carbonate, kaolin kieselguhr, talc, bentonite, fuller's earth, calcined magnesia, powdered cork, powdered wood, and the like.

What is claimed is:

1. A composition of matter having the formula:

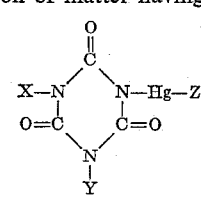

where X is a halogen atom, Y is selected from the group consisting of hydrogen and alkali metal atoms, and Z is a monovalent anion of an acid selected from the group consisting of chloride, bromide, iodide, nitrate, monovalent alkyl carboxylic acid having 1 to 10 carbon atoms in the alkyl group, benzoate, naphthoate, phenylacetate, phenylbutyrate, picolinate, and nicotinate anions.

2. N-monochloro, monohydrogen, isocyanuryl mercuric chloride.

3. N-monochloro, monosodium, isocyanuryl mercuric chloride.

4. N-monochloro, monopotassium, isocyanuryl mercuric chloride.

5. N-monochloro, monohydrogen, isocyanuryl mercuric acetate.

6. A process for preparing a compound having the formula:

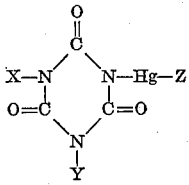

where X is a halogen atom, Y is selected from the group consisting of hydrogen and alkali metal atoms, and Z is a monovalent anion of an acid selected from the group consisting of chloride, bromide, iodide, nitrate, monovalent alkyl carboxylic acid having 1 to 10 carbon atoms in the alkyl group, benzoate, naphthoate, phenylacetate, phenylbutyrate, picolinate, and nicotinate anions, which comprises reacting, in an aqueous medium (1) a cyanurate, (2) from about 0.9 to about 1.4 mols, per mol of said cyanurate, of a halogen, with the proviso that when said cyanurate is a halocyanurate or a mixture of a halocyanurate and a cyanurate other than a halocyanurate, no halogen is required in addition to said halocyanurate, and (3) from about 0.9 to about 3.0 mols, per mol of said cyanurate, of a mercuric salt of an anion having the significance of Z at a temperature in the range of from about 10° C. to about 75° C. and at a pH in the range of from about 2.9 to about 8.0 until said compound is formed.

7. A process for preparing a compound having the formula:

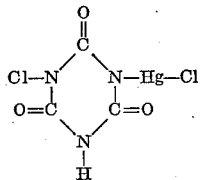

which comprises reacting, in an aqueous medium (1) cyanuric acid, (2) up to about 1 mol, per mol of cyanuric acid, of sodium dichlorocyanurate, and (3) from about 0.9 to about 2.0 mols, per mol based on the combined total mols of cyanuric acid and sodium dichlorocyanurate, of mercuric chloride at a temperature in the range of from about 10° C. to about 75° C. and at a pH in the range of from 2.9 to about 4.0 until said compound forms as a precipitate in said aqueous medium.

8. A process for preparing a compound having the formula:

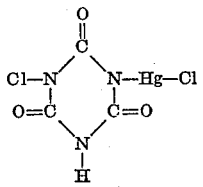

which comprises reaction in an aqueous medium (1) a di-alkali metal cyanurate, (2) from about 0.9 to about 2.0 mols, per mol of said cyanurate, of mercuric chloride, and (3) gaseous chlorine at a temperature in the range of from about 10° C. to about 75° C., the amount of gaseous chlorine employed being an amount sufficient to provide a pH between about 2.9 to 4.0 in said aqueous medium, thereby forming an aqueous slurry comprising said compound dispersed as a solid in the aqueous phase of said slurry and thereafter recovering said compound from the bulk of the aqueous phase of said medium.

9. A process for preparing a compound having the formula:

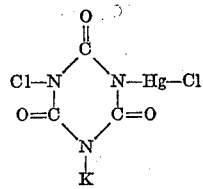

which comprises reacting in an aqueous medium (1) tri-potassium cyanurate, (2) from about 0.9 to about 2.0 mols, per mol of said cyanurate, of mercuric chloride, and (3) gaseous chlorine, a temperature in the range of from about 10° C. to about 75° C., the amount of gaseous chlorine employed being an amount sufficient to provide a pH in the range of from about 5.0 to about 8.0 in said aqueous medium, thereby forming an aqueous slurry comprising said compound dispersed as a solid in the aqueous phase of said slurry, and thereafter recovering said compound from the bulk of the aqueous phase of said medium.

10. A composition comprising a mixture of (1) from about 0.001% to about 95% by weight of a compound having the formula:

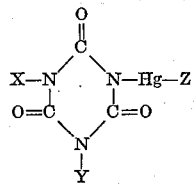

where X is a halogen atom, Y is selected from the group consisting of hydrogen and alkali metal atoms, and Z is a monovalent anion of an acid selected from the group consisting of chloride, bromide, iodide, nitrate, monovalent alkyl carboxylic acid having 1 to 10 carbon atoms in the alkyl group, benzoate, naphthoate, phenylacetate, phenylbutyrate, picolinate, and nicotinate anions, and (2) an inorganic compound, characterized in being compatible with said first compound, selected from the group consisting of water soluble detergent builder salts, alkali metal sulfates, alkali metal chlorides, talc, diatomaceous earth, kaolin, montmorillonite clays, water-insoluble inorganic oxides, water-insoluble alkaline earth metal salts, thixotropic inorganic aquagels, and mixtures thereof.

11. A composition comprising a mixture of (1) from about 1.0% to about 10.0% by weight of a compound having the formula:

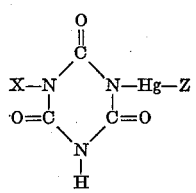

where X is a halogen atom and Z is a monovalent anion of an acid selected from the group consisting of chloride, bromide, iodide, nitrate, monovalent alkyl carboxylic acid having 1 to 10 carbon atoms in the alkyl group, benzoate, naphthoate, phenylacetate, phenylbutyrate, picolinate, and nicotinate anions, and (2) an organic compound selected from the group consisting of hydrolyzed starch, carboxymethyl cellulose, synthetic detergents, petroleum jelly, lanolin, liquid petrolatum, water-insoluble fluorochloroalkanes, water miscible organic alcohols, glycerine, water-miscible ketones, powdered cork, sawdust, walnut shells, powdered water-insoluble synthetic resins, and mixtures thereof.

12. A composition comprising a mixture of (1) from about 1.0% to 10% by weight of a compound having the formula:

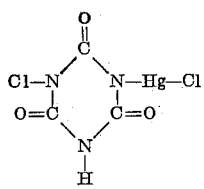

and (2) an organic surface-active agent compatible with said compound.

13. A composition as in claim 12, wherein the organic surface active agent is a sodium alkyl benzene sulfonate in which the alkyl group contains 10 to 16 carbon atoms.

14. A composition comprising a mixture of (1) a minor amount of a compound having the formula:

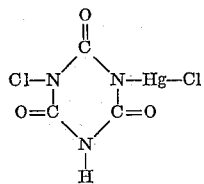

(2) a minor amount of an organic surface active agent, and (3) the balance of said composition consisting essentially of an inorganic detergent builder salt.

15. A bleaching, washing and sanitizing composition comprising a mixture of (1) from about 1.0% to about 10% by weight of a compound having the formula:

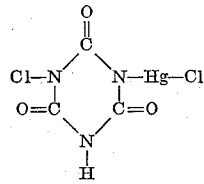

(2) from about 15% to about 50% by weight of a water-soluble detergent builder salt, and (3) a neutral water-soluble inorganic diluent.

16. A composition as in claim 15, wherein the water-soluble detergent builder salt comprises a mixture of an alkali metal tripolyphosphate and an alkali metal carbonate, and the neutral water-soluble inorganic diluent is sodium sulfate.

17. A composition comprising a mixture of (1) from about 1.0% to about 10% by weight of a compound having the formula:

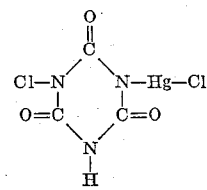

(2) from about 0.5% to about 6.0% by weight of an anionic detergent, and (3) the balance consisting essentially of an inorganic detergent builder salt.

18. A composition as in claim 17, wherein the detergent builder salt is a mixture of sodium tripolyphosphate and sodium carbonate, and the anionic detergent is sodium dodecylbenzene sulfonate.

References Cited by the Examiner

FOREIGN PATENTS 219,930   11/1956   Great Britain.

OTHER REFERENCES

Hantzsch: Berichte der Deutschen Chemischen Gesellschaft, vol. 39, pp. 145–153, January, 1906.

LEWIS GOTTS, *Primary Examiner.*